United States Patent
Gleichauf

(10) Patent No.: US 7,137,145 B2
(45) Date of Patent: Nov. 14, 2006

(54) SYSTEM AND METHOD FOR DETECTING AN INFECTIVE ELEMENT IN A NETWORK ENVIRONMENT

(75) Inventor: Robert E. Gleichauf, Terrell Hills, TX (US)

(73) Assignee: Cisco Technology, Inc., San Jose, CA (US)

( * ) Notice: Subject to any disclaimer, the term of this patent is extended or adjusted under 35 U.S.C. 154(b) by 886 days.

(21) Appl. No.: 10/119,934

(22) Filed: Apr. 9, 2002

(65) Prior Publication Data

US 2003/0191966 A1    Oct. 9, 2003

(51) Int. Cl.
*G06F 11/00* (2006.01)
*G06F 11/22* (2006.01)
*G06F 11/30* (2006.01)
*G06F 11/32* (2006.01)
*G06F 11/34* (2006.01)
*G06F 11/36* (2006.01)
*G06F 12/14* (2006.01)
*H04L 9/32* (2006.01)

(52) U.S. Cl. .................. 726/24; 726/25; 713/187; 713/188; 709/224

(58) Field of Classification Search ............ 726/22–24, 726/25
See application file for complete search history.

(56) References Cited

U.S. PATENT DOCUMENTS

| | | | |
|---|---|---|---|
| 5,414,833 A * | 5/1995 | Hershey et al. ............... | 726/22 |
| 5,889,943 A | 3/1999 | Ji et al. | |
| 6,240,530 B1 | 5/2001 | Togawa ..................... | 714/38 |
| 6,321,336 B1 * | 11/2001 | Applegate et al. ........... | 726/11 |
| 2003/0023857 A1 * | 1/2003 | Hinchliffe et al. .......... | 713/188 |

* cited by examiner

*Primary Examiner*—Gilberto Barron, Jr.
*Assistant Examiner*—Samson Lemma
(74) *Attorney, Agent, or Firm*—Baker Botts L.L.P.

(57) ABSTRACT

A method for detecting an infective element in a network environment is provided that includes detecting, by a first computer, an infective element within a second computer. A signal is generated and communicated that identifies the second computer as being associated with the infective element. The signal includes an address associated with the second computer. The signal is received and, in response to the signal, a communicating capability of the second computer is disabled.

48 Claims, 2 Drawing Sheets

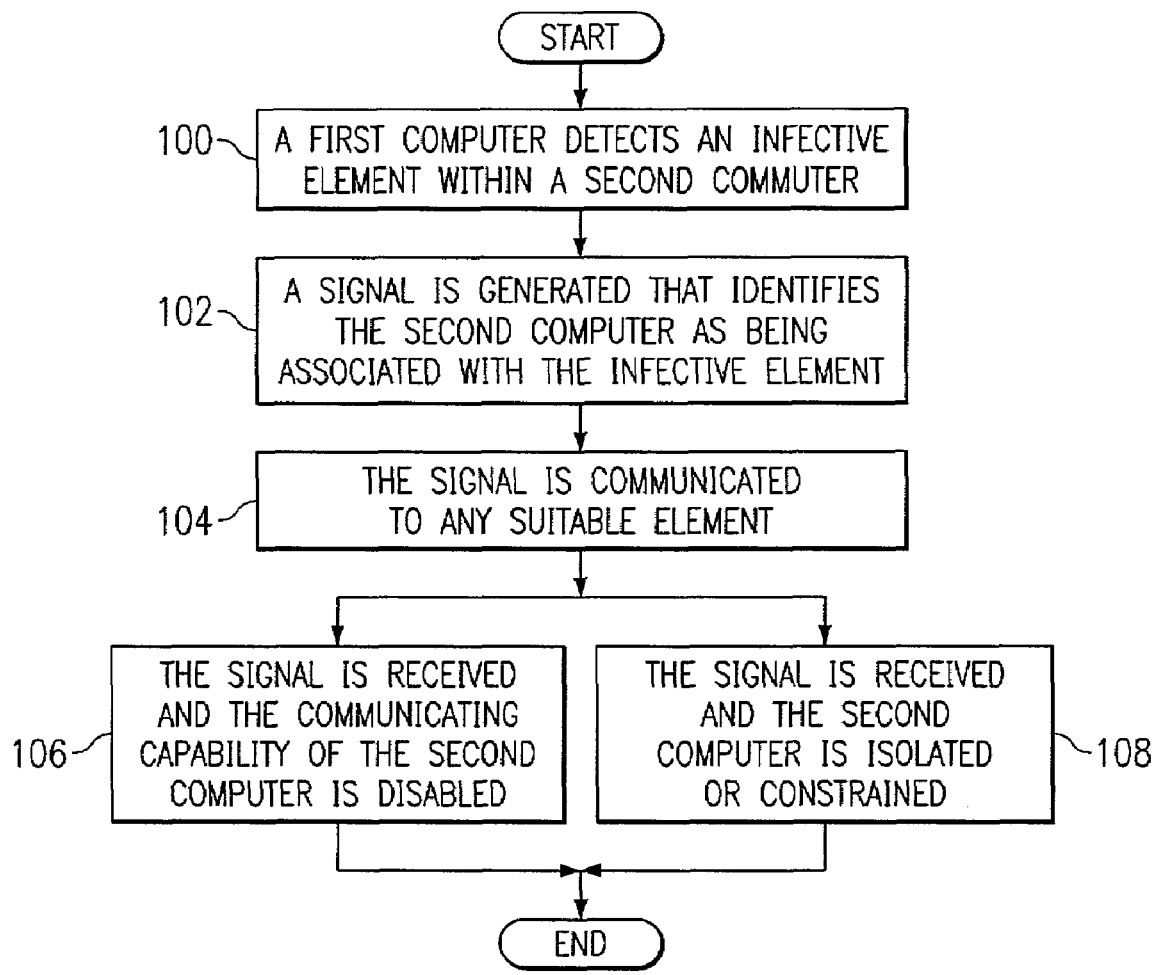

SYSTEM AND METHOD FOR DETECTING AN INFECTIVE ELEMENT IN A NETWORK ENVIRONMENT

TECHNICAL FIELD OF THE INVENTION

This invention relates in general to intrusion detection, and more particularly to a system and method for detecting an infective element in a network environment.

BACKGROUND OF THE INVENTION

Network and information security are two areas that have grown increasingly important in communication environments. The threat of external agents such as viruses, worms, Trojans and other damaging elements pose a serious risk to computer system architectures and end users alike. If not contained properly, these damaging elements may wreak havoc on network systems by disrupting communication flows, violating privacy, compromising the integrity of information within the system, or corrupting data residing on the network architecture.

Several strategies have been employed to combat the negative effects of these harmful external agents; however, some of these strategies are limited in that they only address certain types of attacks, which must be generated from specific locations. In addition, many of these strategies suffer from providing only minimal protection at limited areas within the network system. Moreover, many of these strategies are slow in identifying and containing harmful elements that may have entered the network. Also, many of these strategies are generally ineffective because of their predictability in how their corresponding security tactics and protocols are implemented. The predictable nature of these approaches allows hackers to easily pinpoint areas of vulnerability within an associated system and attack those areas such that damaging elements can penetrate a network undetected by the existing security elements.

SUMMARY OF THE INVENTION

According to one embodiment of the present invention a method for detecting an infective element in a network environment is provided that includes detecting, by a first computer, an infective element within a second computer. A signal is generated and communicated that identifies the second computer as being associated with the infective element. The signal includes an address associated with the second computer. The signal is received and, in response to the signal, a communicating capability of the second computer is disabled.

In accordance with another embodiment of the present invention, a method for detecting an infective element in an network environment is provided that includes detecting, by a first computer, an infective element at a second computer based on communications between the first and second computers. A signal is generated and communicated that identifies the second computer as being associated with the infective element. The signal includes an address associated with the second computer. The signal is received and, in response to the signal, a communicating capability of the second computer is disabled.

Some embodiments of the present invention provide a number of technical advantages. For example, according to one embodiment of the present invention a network management controller is provided that operates to immediately disable the communications capability of a rogue (or an infected computer) that contains an infective element by removing its corresponding address. This prohibits the rogue from communicating to a next computer or to another destination, which may infect additional elements within the network. The network management controller allows for the quarantine of malicious traffic immediately after it is discovered within the network architecture. This is important because time is a critical element in containing infective elements once they have penetrated the corresponding security system.

Another technical advantage of one embodiment of the present invention is a result of the communication protocol shim, which allows cooperative communication amongst all network components within a communication system. Once an infective element is discovered, the communication protocol shim may generate any number of signals that allow other network components to recognize that an infective element has entered the system. For example, the communication protocol shim may send a signal to the network management controller that someone within the network has received a virus, a worm, a Trojan, or some other damaging element. The network management controller may then respond to the signal by broadcasting an alert signal to all network components that communications from the infected device should be avoided or rejected. Alternatively, the network management controller may simply disable the communications capability of the infected device directly by removing its address, as described above. The communication protocol shim may also generate a message to a scout element, which may in turn broadcast an alert signal to all interested components within the network that an element within the communication system has been infected. This cooperative signaling using the communication protocol shim and the network management controller allows quick identification of an infective element even in cases where computers within the network architecture are not in compliance with existing security protocols. Even in systems where strict scrutiny is provided for security parameters, any number of devices may be out of compliance and thus susceptible to receiving (and potentially distributing) an infective element. Cooperative signaling offers a way to promptly isolate a rouge (which may or may not be in proper security compliance) by allowing a network component to monitor its peers and to report the introduction of infective elements into a system immediately after being recognized.

Yet another advantage of one embodiment of the present invention is that a computer containing an infective element may be directed to a remediator website in order to comply with a network security enforcement protocol. The remediator website may then facilitate the removal of the infective element from the component suspected of including damaging information. The suspected component may continue to communicate with the remediator website until it removes the infective element or until it is otherwise cured or deemed in proper compliance with existing security protocols, at which time it may be permitted to resume communications with other network components.

Embodiments of the present invention may enjoy some, all, or none of these advantages. Other technical advantages are readily apparent to one skilled in the art from the following figures, the description, and the claims.

BRIEF DESCRIPTION OF THE DRAWINGS

Reference is made to the following description taken in conjunction with the accompanying drawings in which:

FIG. 3 is a flowchart illustrating a series of steps associated with a method for detecting an infective element in a network environment in accordance with one embodiment of the present invention.

DETAILED DESCRIPTION OF EXAMPLE EMBODIMENTS OF THE INVENTION

Figure 1:
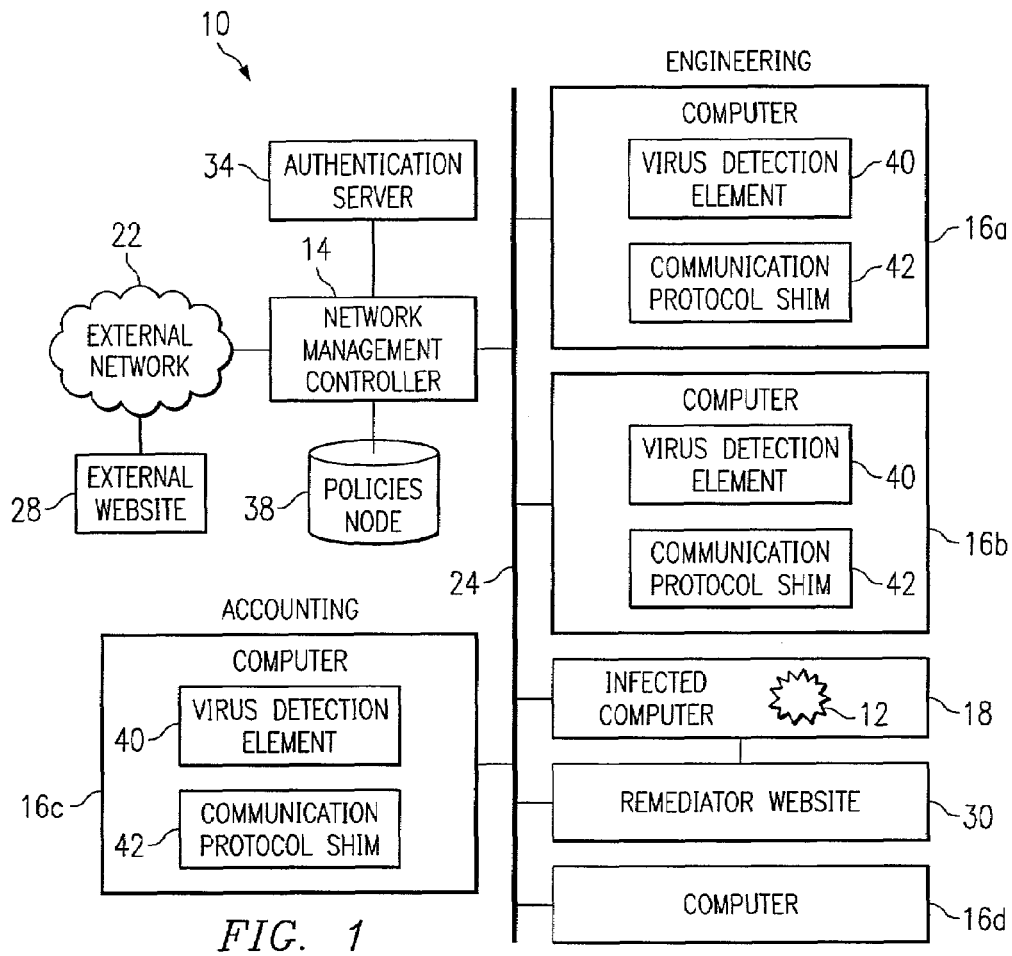
FIG. 1 is a simplified block diagram of a communication system for detecting an infective element in a network environment in accordance with one embodiment of the present invention.

Example embodiments of the invention are best understood by referring to FIGS. 1 through 3 of the drawings in which like numerals refer to like parts.

FIG. 1 is a block diagram of a communication system 10 for detecting an infective element 12 in a network environment in accordance with one embodiment of the present invention. Communication system 10 includes a network management controller 14, multiple computers 16a–16d, an infected computer 18, an external network 22, and an internal network 24. Additionally, communication system 10 includes an external website 28, a remediator website 30, an authentication server 34, and a policies node 38.

In accordance with the teachings of the present invention, communication system 10 provides an architecture for identifying infective element 12 after it has been introduced into the architecture of communication system 10. Communication system 10 also provides the ability to pinpoint or otherwise recognize the location of infective element 12 as within infected computer 18. In implementing a communications protocol, computers 16a, 16b, and 16c offer a peer monitoring feature that detects damaging elements, such as infective element 12, as they enter communication system 10. Accordingly, a cooperative signaling approach is provided for computers 16a, 16b, and 16c, whereby infected computer 18 is targeted as a rogue, i.e., inclusive of some malicious file, corrupt data segment, or non-compliant operation, which may cause harm to components within communication system 10.

In addition, a signal may be generated and transmitted by any one of computers 16a, 16b, and 16c to network management controller 14 such that a source associated with infective element 12 is identified. This signal may include an address associated with infected computer 18, which has received infective element 12. Based on this signal, network management controller 14 may then disable a communicating capability of infected computer 18 such that infective element 12 may not be communicated to a next destination. Network management controller 14 may also implement other suitable actions based on the protocols implemented within communication system 10 in order to sandbox, siderail, isolate, or otherwise disable infected computer 18 from communicating further.

This community monitoring approach allows for the quarantine of malicious traffic immediately after it is discovered within the network architecture. This is particularly critical in network security systems where time is of the essence in containing damaging information, such as infective element 12, once a security breach has occurred within communication system 10. In addition, communication system 10 offers the benefit of peer monitoring, whereby only a selected number of peers within the network community need to be properly configured in order to identify a rogue within the system architecture. Network management controller 14 may respond to the identification of infective element 12 with any number of appropriate remedies (as described in greater detail below) in order to prohibit infective element 12 from permeating through the system being threatened.

Infective element 12 is a damaging object or piece of information, which may be introduced into communication system 10 by any network component. Infective element 12 may be a Trojan, a worm, a virus, or any other damaging element that operates to corrupt data, compromise the integrity of information, erase or modify data, or generally disrupt properly functioning elements within communication system 10. Infective element 12 may also correspond to non-compliant software or operations of infected computer 18 according to outdated protocols.

A Trojan is a program that performs some unexpected or some unauthorized (usually malicious) action such as displaying messages, erasing files, or corrupting the formatting of a disk, for example. Trojans may also transmit data to other destinations, and operate as proxies for some master agent. A Trojan generally can also infect other host files. A Trojan is typically inserted on one or more target machines (such as any one of computes 16a–16d or infected computer 18) and lays dormant until it is instructed to initiate some action, such as to propagate, to transmit, or (most commonly) to execute an improper a denial of service (DoS) function.

DoS attacks are strategies employed in order to tie up mission-critical resources used to run websites or enterprise applications. In some cases, security gaps and glitches or other vulnerabilities in Unix or Windows operating systems are exploited to intentionally crash a corresponding system. In other cases, large amounts of ostensibly valid traffic are directed to single sites until the sites become overloaded and crash. Forms of DoS attacks include: Code Red, nimda, ping-pong, SYN flood, UDP flood, and Smurf attacks. Some DoS strategies intend to simply clog network peering points. DoS attacks may also be used where a hacker has gained access to some portion of a vulnerable networking system. Infiltrating software may be installed on the compromised machine, such as infected computer 18, so that it may be activated remotely in order to launch a corresponding attack. In order to launch the DoS attack, hackers generally only need a single port of access to a corresponding system. Hackers may use any number of devices in order to gain initial access such as: network scanners or sniffers, password cracking and guessing tools, session hijacking, and Internet protocol (IP) spoofing.

A worm is a self-contained program or set of programs that is able to spread functional copies of itself or its segments to other computers. This propagation of copies may transpire via network connections or email attachments. Worms may self-propagate, and piggy-back on virtually any network service, such as hypertexts transfer protocol (HTTP) formats.

A virus is a malicious program that may be introduced into a network architecture in an email attachment, a file load, a program, or in any other suitable entry form. Viruses may be classified into various types depending on file formats and infection routines. Such examples of viruses include: macro viruses, boot sector viruses, script viruses, file infecting viruses, ActiveX malicious code viruses, and destructive viruses.

An example of a virus implementation that seeks to penetrate communication system 10 is a Zip file with a Word document attached to the file. An end user may open the Zip file in order to view the document; the associated machine of the end user may indirectly or directly save the Word document. With the document in the system, the virus performs its designated functions. The virus capitalizes on buffer overflow (and generally has the requisite knowledge to do so) in the Word program such that it gains access through the overflow and begins to impair the system in whatever way it was programmed to do e.g., delete files, corrupt data, change or modify information, etc. Viruses may be detected via a suitable notification, such as those disclosed through a window that is automatically generated by a virus detection protocol. Security protocols, such as anti-virus software, may generate this type of window. The window may explain, for example, that John X is trying to communicate with your machine and further ask for the end user's permission to do so.

Infective element 12 may be introduced into infected computer 18 in any number of ways. For example, an end user of infected computer 18 may use infected computer 18 to view pages on the Internet with a web browser. Thus, infective element 12 may be roaming somewhere within the Internet, where it can be downloaded directly, inadvertently communicated, or otherwise transmitted indirectly to infected computer 18. For example, infected computer 18 may wish to communicate with external website 28 in order to retrieve some file or some piece of data. In communicating the data or file back to infected computer 18, external website 28 may intentionally or inadvertently pass a harmful element, such as infective element 12, through external network 22, internal network 24, and on to infected computer 18. This may be done in any suitable networking scenario: for example, in the context of ordering something from an online retailer or browsing webpages or information on a website.

The potentially harmful communication of a malicious or damaging element into a system may be a result of any number of failures of internal network 24 and infected computer 18 to delete, circumvent, or otherwise avoid receiving infective element 12. For example, security software that only runs at certain times during the day may have a potential vulnerability in the protection that it provides if infective element 12 is downloaded or otherwise communicated at some non-secure time or gap period when the security function is not being executed. Additionally, security software may fail where an end user opts to intentionally disable desktop security functions (such as anti-virus protocols for example) for performance reasons, i.e. to increase the speed of the associated device, which is being slowed by the security features.

Infective element 12 may also be received by infected computer 18 from communications traffic from an internal website or network, commonly referred to as an IN-IN communication flow. For example, internal network 24 may offer a payroll website that includes information about employee benefits. When an end user of computer 16a accesses the payroll website, computer 16a may inadvertently receive a damaging element if the payroll website has experienced a breach in its corresponding security. This problem may exist because in certain environments, internal traffic is not adequately monitored or otherwise evaluated in order to restrict the introduction of potential damaging elements. This presents an intensely destructive problem in that a virus, a Trojan, or a worm may penetrate a security system at a single computer, such as infected computer 18, and then infect all of the internal components connected to the internal system of a company, corporation, or other entity. Perhaps even more dangerous is the potential for this internal security breach to further contaminate outside entities as infective element 12 may be communicated to contacts or clients identified by the internal structure. In this scenario, an entity may inadvertently communicate infective element 12 to any number of clients or other persons that interact or that are associated with the originally-infected entity.

Network management controller 14 is a communications interface operable to receive data from any number of devices within communication system 10. Network controller 14 may also receive information from external network 22 and pass that information to any one of the elements coupled to internal network 24, such as computers 16a–16d and infected computer 18. Network management controller 14 may also receive the address of infected computer 18 within the signal. Network management controller 14 cooperates with a signaling protocol of communication system 10 in order to quickly identify an inside vector or rogue present within a network architecture. Network management controller 14 may include any hardware, software, object, or elements operable to provide a network communications interface and to receive a signal that identifies the entry of a damaging element within communication system 10.

Network management controller 14 may respond to receiving the signal by implementing any number of potential remedies in order to address the presence of infective element 12 within infected computer 18. For example, network management controller 14 may respond to the signal by employing sandboxing or siderailing techniques on the associated infected device or unit. In addition, network management controller 14 may position an infected device or unit on an island or suitably disable the infected device or unit by removing or reassigning its associated address. This address may be any suitable identification element or tool that operates to distinguish infected computer 18 from other component within communication system 10.

In accordance with a particular embodiment of the present invention, network management controller 14 may remove or reassign the IP address of infected computer 18 such that the communicating capability of infected computer 18 is disabled. Network management controller 14 may implement this and other appropriate remedial procedures in order to prohibit infected computer 18 from communicating infective element 12 to a next destination. Network management controller 14 may also direct infected computer 18 to remediator website 30. Infected computer 18 may then communicate with remediator website 30 until infective element 12 is removed or until infected computer 18 is otherwise brought in compliance with suitable networking security protocols. In addition, network management controller 14 may generate an alert signal to be broadcast to any element that might interact with infected computer 18. The alert signal may include information such as: the address (or the IP address) of infected computer 18, the type of damaging element present in the network, or remedial measures for dealing with an encounter with infected computer 18.

In a particular embodiment of the present invention, network management controller 14 may leverage or otherwise control dynamic host configuration protocol (DHCP) services in order to disable infected computer 18. The DHCP protocol represents a platform that lets a network operator to centrally manage (and to automate where appropriate) the assignment of IP addressing configurations within a communication system 10. Without the DHCP configuration, an IP address must be entered manually at each entity or system wishing to communicate in the network environment. DHCP also allows network management controller 14 to supervise and to distribute IP addresses from a central point.

End users, such as those using computers 16a–16d, may have an assigned IP address that is static or dynamically assigned from a pool of addresses. End users may then register for selected services provided within the network. These services may be stored in polices node 38. These services may include internet services, intranet services, and other various services such as push services or priority services offered to an end user. Network management controller 14 may gain control of the IP address granted to an end user when that end user logs on to internal network 24. Control of the IP address provides an executive power to network management controller 14 because an invalid IP address effectively disables a communicating capability of an associated device within communication system 10.

Figure 2A:
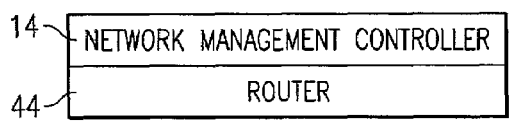
FIG. 2A is a block diagram of an example implementation of a network management controller included within the communication system of FIG. 1 in accordance with one embodiment of the present invention.
Figure 2B:
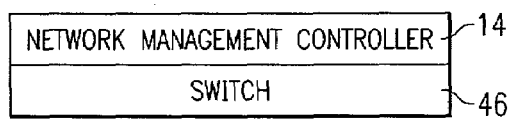
FIG. 2B is a block diagram of another example implementation of a network management controller included within the communication system of FIG. 1 in accordance with one embodiment of the present invention.
Figure 2C:
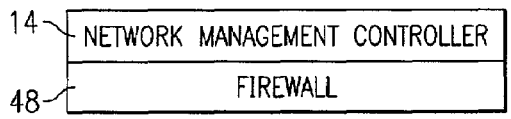
FIG. 2C is a block diagram of yet another example implementation a network management controller included within the communication system of FIG. 1 in accordance with one embodiment of the present invention.

Network management controller 14 may be coupled to, or implemented in conjunction with, any number of networking devices or elements within communication system 10. FIGS. 2A–2C illustrate a number of example implementations in which network management controller 14 may be leveraged with existing network equipment. For example, network management controller 14 may be coupled to a router 44 as illustrated in FIG. 2A. Alternatively, network management controller 14 may be inclusive of router 44 or indirectly coupled to router 44 where appropriate. Router 44 is a device or a piece of software that determines the next network point to which a packet of information is directed in communication system 10. Router 44 may be coupled to any other network component within communication system 10 or to another router where appropriate. Additionally, router 44 may be positioned at a gateway or at a communications interface in order to direct packets of information from one point to the next. Router 44 may receive data packets from computers 16a–16d and infected computer 18 and communicate those packets to external network 22. In addition, router 44 may receive data packets from external network 22, such as via external website 28, and communicate those packets of information back to one or more computers 16a–16d and infected computer 18.

FIG. 2B is a block diagram that illustrates another example implementation network management controller 14 in which a switch 46 is coupled to network management controller 14. Network management controller 14 may be coupled to switch 46 directly or indirectly, or alternatively switch 46 may be positioned within network management controller 14. Switch 46 operates to receive one or more data packets from a communicating device and communicates those data packets to selected locations within communication system 10. In addition, switch 46 may receive one or more data packets from external network 22, policies node 38, or any other suitable element or device within or external to communication system 10 in order to communicate information to one or more elements within communication system 10.

FIG. 2C is a block diagram illustrating another example implementation of network management controller 14. A firewall 48 may be coupled to network management controller 14 and may operate to discard, delete, or otherwise avoid damaging data segments sought to be communicated to any element or device within communication system 10. Alternatively, firewall 48 may be inclusive of network management controller 14 or coupled indirectly to network management controller 14 where appropriate. Firewall 48 is a system architecture that enforces an access control policy between two nodes, such as a virtual private network (VPN) and a public node, such as the Internet. A VPN is a private data network that makes use of the public network infrastructure. A VPN network may provide secured sharing of public sources for data by using encryption techniques to ensure that only authorized users can view or "tunnel" into a company's private networking files.

Firewall 48 may determine which inside services or elements can be accessed from outside sources and which outside services and elements can be accessed by inside sources. In essence, firewall 48 may be viewed as a pair of tools that block and permit communications traffic. Firewall 48 may also provide a single choke point where security functions or audits (such as audits based on policies stored in policies node 38) may be imposed. Firewall 48 may also provide a network administrator with data associated with what kinds or what amount of traffic has passed through it and how many attempts were made to break through the firewall architecture. Firewall 48 may also hide information about a network to which it is coupled and make it seem as though all outgoing traffic originates from firewall 48 rather than from internal network 24.

Referring back to FIG. 1, computers 16a–16d and infected computer 18 each represent a device that accepts information in the form of digital data and manipulates that information for some result based on a program or on a sequence of instructions. In a particular embodiment of the present invention, computers 16a–16d each represent a desktop central processing unit that may receive and communicate data within communication system 10. Alternatively, computers 16a–16d and infected computer 18 may be any other suitable device for the communication of data. For example, computers 16a–16d and infected computer 18 may be a cellular or wireless telephone, a personal digital assistance (PDA), a laptop or an electronic notebook, or any other device, component, or object capable of initiating voice or data exchanges within communication system 10. Computers 16a–16d and infecting computer 18 may additionally provide an interface to the human user, such as via microphone, display, keyboard, or other terminal equipment such as an interface to a personal computer or to a facsimile machine in cases where computers 16a–16d and infected computer 18 are used as a modem. Computers 16a–16d, and infected computer 18 may also be a database or a program capable of facilitating a data exchange between two nodes. Data, as used herein, refers to any type of numeric, voice, video or script data, or any other suitable information in any appropriate format that may be communicated from one point to another.

Computers 16a and 16b are illustrated in FIG. 1 as being included in a subset of computers particular to an engineering unit or an engineering division within a company or an entity. In addition, computer 16c is illustrated as associated with an accounting unit or division within an entity. Each of computers 16a–16d, as well as infected computer 18, are coupled to internal network 24 such that they may exchange data or otherwise interact in a network environment.

Computers 16a–16c each include, in one embodiment, a virus detection element 40 and a communication protocol shim 42. Computer 16d, however, does not include any type of virus detection element or communication protocol element. Computer 16d offers an example illustration of a communications unit within communication system 10 that is not in compliance with any security protocol.

Virus detection element 40 is an element or an object capable of detecting a damaging element after it has entered communication system 10. Virus detection element 40 may be a collection of routines or programs that execute pattern matching, looking for specific or systematic traffic behavior. Data packet patterns may provide a medium for which damaging elements within a system's architecture may be identified. Virus detection element 40 may include any hardware, software, or elements operable to detect a damaging element, such as infective element 12, present in communication system 10. Virus detection element 40 may also be a desktop firewall product, such as those produced by Symantec Inc., Network Associates, or Computer Associates that perform some (potentially routine) security screening in insuring that a corresponding element is clean of potential harmful elements. Virus detection element 40 may also be capable of identifying a particular type of damaging element, such as a Trojan, a worm, or a virus, for example. Virus detection element 40 may communicate information associated with the type of damaging element introduced into communication system 10 to communication protocol shim 42, to network management controller 14, or to any other suitable location. Each of computers 16a–16c may also include any suitable element operable to facilitate, or otherwise execute the disabling of a communications capability of infected computer 18.

By providing a number of virus detection elements 40 within communication system 10, a number of computers 16a–16c are equipped with the intelligence to monitor their peers. This is important because even peers that are not in proper security compliance benefit from the teachings of the present invention in that they may be monitored and protected by other computers using cooperative signaling techniques. Accordingly, even a single computer equipped with communication protocol shim 42 may mitigate the negative affects of outdated or out of compliance components within a corresponding network.

Communication protocol shim 42 is a communications protocol element that facilitates community monitoring within communication system 10. Communication protocol shim 42 may include hardware, software, or any other object or element operable to provide a signaling protocol to communication system 10. Communication protocol shim 42 may also include a firewall protection element that ensures an integrity check has been executed. Communication protocol shim 42 may be configured such that once infected element 12 is identified, a signal is generated and sent to network management controller 14. Communication protocol shim 42 provides cooperative signaling amongst peers by monitoring network components such that infected element 12 may be quickly identified. Communication protocol shim 42 may signal the presence of infective element 12 at infected computer 18 in any number of ways as discussed below.

In operation, once a damaging element is detected, communication protocol shim 42 may send a signal directly to infected computer 18 that signifies that infective element 12 is within its internal structure. Infected computer 18 may then respond to the signal by communicating with remediator website 30, or alternatively by performing some cleaning or security check for its corresponding internal structure.

Communication protocol shim 42 may also respond to the detection of infective element 12 by sending a signal to network management controller 14 that identifies infected computer 18 as inclusive of infective element 12. The signal may include the address of infected computer 18, which uniquely identifies or otherwise distinguishes infected computer 18 from other components within communication system 10. The signal generated and communicated by communication protocol shim 42 may be inclusive of the IP address of infected computer 18.

In another embodiment of the present invention, communication protocol shim 42 responds to the detection of infective element 12 by broadcasting (or unicasting where appropriate to specific elements within communication system 10) a generic signal to all network components within communication system 10 such that each of the components are aware of infective element 12. A suitable broadcasting element coupled to network management controller 14 may also provide this operation to communication system 10. This embodiment would allow, for example, computer 16c to identify and to further avoid communications transmitted from infected computer 18. The broadcast signal may include an address or some other piece of information that uniquely identifies infected computer 18. In addition, the broadcast signal may include the type of damaging element present in communication system 10 and further provide remedial measures to be taken if the damaging element is subsequently encountered.

As described above, communication protocol shim 42 may generate a signal that includes numerous pieces of information that relate to the presence of infective element 12. For example, the signal may include the location of infective element 12 as given by a corresponding address (possibly an IP address) of where infective element 12 resides. In addition, the signal generated and communicated by communication protocol shim 42 may include information relating to the type of damaging element that has entered the system. Also, the signal may include information for remedial measures for coping with or for combating the damaging element. For example, certain damaging elements may be eliminated from the system by a simple deletion instruction, whereas others may need more complex instructions for how to combat their presence. Alternatively, the signal generated by communication protocol shim 42 may include any other suitable information that offers some guidance in handling the presence or harmful affects of infective element 12.

External network 22 represents a series of points or nodes of interconnected communication paths for receiving and transmitting packets of information that propagate through communication system 10. External network 22 may offer a communications interface between a node, such as external website 28, and any element connected to internal network 24. External network 22 may be any local area network (LAN), metropolitan area network (MAN) or wide area network (WAN), or any other appropriate architecture or system that facilitates communications in a mesh (wireless) network or in other suitable network environments. External network 22 implements a transmission control protocol/internet protocol (TCP/IP) communication language protocol in a particular embodiment of the present invention; however, external network 22 may alternatively implement any other suitable communication protocol for transmitting and receiving data packets within communication system 10.

Internal network 24 represents an internal architecture that provides a communicative interface to one or more network components within communication system 10. Internal network 24 allows computers 16a–d, infected computer 18, network management controller 14, and remediator website 30 to interact with each other in a network environment. In addition, internal network 24 may provide a communicative interface for any other elements or components within or external to communication system 10. Internal network 24 is a VPN in a particular embodiment of the present invention; however internal network 24 may alternatively by any LAN, MAN, WAN, or any other architecture system that facilitates communications in a network environment. Internal network 24 implements a TCP/IP communication language protocol in a particular embodiment of the present invention; however, internal network 24 may alternatively implement any other suitable communication protocol for transmitting and receiving data packets within communication system 10.

External website 28 is a collection of webfiles or data that resides in a particular network location. External website 28 may be any company, organization, individual, or entity that offers information to be communicated on the network environment. External website 28 is coupled to external network 22 and may be accessed by any of computers 16a–16d. In the example provided above, external website 28 communicated infective element 12 to infected computer 18 via external network 22 and internal network 24.

Remediator website 30 is a security element designed to facilitate the removal of infective element 12 from infected computer 18 in accordance with one embodiment of the present invention. Remediator website 30 is coupled to internal network 24 and infected computer 18, and may receive a communication from infected computer 18 after it has been identified as a rogue, i.e. inclusive of a damaging element. Infected computer 18 may be shunted or otherwise directed to remediator website 30 until the proper software or configurations are downloaded or until infective element 12 is removed from infected computer 18. Remediator website 30 may include hardware, software, or any other object or element that combats or that facilitates the removal of infective element 12. Alternatively, where infected computer 18 has been erroneously directed to remediator website 30, remediator website 30 may evaluate infected computer 18 and determine that it is in proper security compliance and accordingly permit infected computer 18 to further communicate within communication system 10.

Authentication server 34 is a server program that handles requests for access to computer architecture resources. Authentication server 34 may provide authentication, authorization, and accounting services (as well as overall management) to internal network 24 and external network 22. Authorization generally refers to the process of giving an end user permission to do or to access something. In multi-user computer systems, a system administrator may define for the system which end users are allowed access to given locations in the system and further what privileges for an end user are provided. Once an end user has logged into a sub-network, such as internal network 24 for example, the sub-network may wish to identify what resources the end user is given during the communication session. Thus, authorization within communication system 10 may be seen both as a preliminary setting up of permissions by a system administrator and the actual checking or verification of the permission values that have been set up when an end user of any one of computers 16a–16d is attempting access.

Authentication generally refers to the process of determining whether an end user is in fact who or what it is declared to be. In the case of private or public networks, authentication may be commonly done, for example, through the use of unique digital certificates or log-on user password pairs or any other distinguishing identification element. Knowledge of the password offers a presumption that the end user is authentic. Accounting services and overall management generally refers to the ability to monitor and record the networking actions of computers 16a–16d. This user or session information may be stored in the form of a profile for specific end users or for specific components within communication system 10.

Authentication server 34 may also authenticate any one of computers 16a–16d such that false signals, purporting to identify a false damaging element as present within communication system 10, may be appropriately disregarded. Authentication server 34 may receive a signal from network management controller 14 that requests an authentication function to be performed before network management controller 14 proceeds to disable a communication capability of infected computer 18. Authentication server 34 may respond to the query by properly authenticating the selected computer, which generated and communicated the signal identifying infected computer 18 as inclusive of infective element 12.

In a particular embodiment of the present invention, network management controller 14 may additionally implement a "Byzantine Agreement" protocol in which multiple computers 16a–16d must generate and communicate a signal identifying infected computer 18 as inclusive of infective element 12 before network management controller 14 initiates an action. This "Byzantine Agreement" protocol allows network management controller 14 to disregard false signals or signals that are invalid such that an action to disable a communicating capability of infected computer 18 is only executed after at least two signals (or some suitable configurable number) identifying infective element 12 have been received by network management controller 14.

Policies node 38 is a data storage element that includes protocols that dictate what may be accessed and run by elements within communication system 10. Policies node 38 may be coupled to network management controller 14 and may communicate information thereto, which enables network management controller 14 to implement policies based on the specific restrictions or capabilities of computers 16a–16d. The policies included within policies node 38 may be items such as: quality of service, access/authorization privileges, high availability, priority, or any other suitable network enhancement or communications feature.

In a particular embodiment of the present invention, network management controller 14 may access policies node 38 in order to retrieve information about the services provided to each of computers 16a–16d and infected computer 18. In the case where infected element 18 is discovered as inclusive of infective element 12, network management controller 14 may access policies node 38 in order to disable one or more of those policies or services being provided to infected 18 until it properly complies with the requisite security parameters. This allows network management controller 14 yet another way to address infected computer 18 once infective element 12 is discovered within communication system 10. Thus, policies node 38 offers the ability to directly effect a policy relating to infected computer 18, which is sought to be restricted because of the presence of a damaging element.

FIG. 3 is a flowchart illustrating a series of steps associated with a method for detecting infective element 12 within communication system 10 in accordance with one embodiment of the present invention. The method begins at step 100 where a first computer, such as computer 16a for example, detects infective element 12 within a second computer (infected computer 18 for purposes of this example) through inspection of traffic sent from or otherwise associated with infected computer 18. Infective element 12 may be detected by virus detection element 40 or through the monitoring of network traffic sent by computer 18.

At step 102 a signal is generated by communication protocol shim 42 that identifies infected computer 18 as being associated with infective element 12. The signal may include the IP address of infected computer 18, the type of damaging element infective element 12 is, the remedial measures to be taken when encountering infective element 12, or any other suitable information relating to the presence of infective element 12. The signal may be communicated directly to infected computer 18, to any one of a number of components coupled to internal network 24, or to network management controller 14 as illustrated in step 104.

From step 104, the signal may be responded to in various ways as illustrated by steps 106 and 108. At step 106, the signal is received and a communicating capability of infected computer 18 may be disabled. The disablement may include removing or reassigning the address associated with infected computer 18. Alternatively, at step 108 infected computer 18 may be disabled by employing sandboxing, constraining, isolating, or siderailing techniques as described above. In addition, communications may be avoided by network components forewarned of potential harmful elements, items, or agents communicated by infected computer 18. Network management controller 14 may also execute any number of other actions in order to prohibit infected computer 18 from further communications. For example, network management controller 14 may access polices node 38 in order to restrict some service offered to infected computer 18 or invoke policies node 38 in removing the IP address of infected computer 18. In addition, network management controller 14 may broadcast an alert signal to components within communication system 10 to beware of communications from infected computer 18.

Although several embodiments have been illustrated and described in detail, it will be understood that various substitutions and alterations can be made therein without departing from the teachings of the present invention. For example, although the peer monitoring approach of the present invention has been described with reference to a network application, communication system 10 may be implemented in any environment that seeks to implement a security protocol, such as in wireless networks, database architectures, or cellular telephone applications, for example. This may include any device or element susceptible to receiving a harmful element via some digital communication.

Additionally, although numerous components, such as network management controller 14 or communication protocol shim 42, have been illustrated in designated positions of communication system 10, these elements may be placed in any suitable location or within any appropriate structure such that the cooperative signaling approach of the present invention is achieved. Numerous other changes, substitutions, variations, alterations, and modifications may be suggested to one skilled in the art, and it is intended that the present invention encompass all such changes, substitutions, variations, alterations, and modifications as following within the spirit and scope of the appended claims.

What is claimed is:

1. An apparatus for detecting an infective element in a network environment, the apparatus comprising:
   a first computer including:
      a virus detection element operable to detect an infective element within a second computer; and
      a communication protocol shim operable to generate and to communicate a signal that identifies the second computer as being associated with the infective element, wherein the signal includes an address associated with the second computer; and
   a network management controller coupled to the first computer and operable to receive the signal and in response to the signal, disable a communicating capability of the second computer, wherein the network management controller disables the communicating capability of the second computer by directing the second computer to a remediator website until the infective element is removed from the second computer, the remediator website operable to facilitate removal of the infective element from the second computer.

2. The apparatus of claim 1, further comprising a router coupled to the network management controller and operable to receive one or more data packets from each of the first and second computers, wherein the router is operable to direct the packets to a next destination and to disable the communicating capability of the second computer.

3. The apparatus of claim 1, further comprising a firewall coupled to the network management controller and operable to monitor data propagating from an external network to a selected one of the first and second computers, wherein the firewall is further operable to restrict damaging data segments from being communicated to the first and second computers and to disable the communicating capability of the second computer.

4. The apparatus of claim 1, further comprising a switch coupled to the network management controller and operable to receive and to direct one or more data packets received from the first and second computers to a next destination, the switch being further operable to disable the communicating capability of the second computer.

5. The apparatus of claim 1, wherein the network management controller disables the communicating capability of the second computer by executing a selected one of removing and reassigning an address associated with the second computer such that the second computer cannot communicate the infective element to a next destination.

6. The apparatus of claim 1, wherein the signal includes information that characterizes the infective element as selected from the group consisting of:
   a) a Trojan;
   b) a worm; and
   c) a virus.

7. The apparatus of claim 1, wherein the communication protocol shim communicates the signal to a third computer, the third computer operable to receive the signal and to identify the address of the second computer such that communications from the second computer are recognized and rejected by the third computer until the infective element is removed.

8. The apparatus of claim 1, wherein the communication protocol shim communicates the signal to the second computer.

9. The apparatus of claim 1, wherein the network management controller responds to receiving the signal by communicating an alert signal to one or more network components, the alert signal including the address of the second computer associated with the infective element.

10. The apparatus of claim 1, further comprising an authentication server coupled to the network management controller and operable to authenticate the first computer before disabling the communicating capability of the second computer.

11. The apparatus of claim 1, further comprising a broadcast element coupled the network management controller and operable to generate and to transmit an alert signal to one or more network components based on information associated with the infective element communicated by the network management controller, the alert signal including the address of the second computer associated with the infective element.

12. The apparatus of claim 1, further comprising a policies node coupled to the network management controller and operable to provide one or more network services to each of the first and second computers, the policies node responding to direction from the network management controller by restricting one or more of the network services provided to the first and second computers.

13. The apparatus of claim 1, further comprising a third computer that includes:
 a virus detection element operable to detect the infective element within the second computer; and
 a communication protocol shim operable to generate and to communicate an additional signal that identifies the second computer as being associated with the infective element, wherein the network management controller disables the communicating capability of the second computer after receiving both of the signals.

14. A method for detecting an infective element in a network environment, the method comprising:
 detecting, by a first computer, an infective element within a second computer;
 generating and communicating a signal that identifies the second computer as being associated with the infective element, wherein the signal includes an address associated with the second computer; and
 receiving the signal and, in response to the signal, disabling a communicating capability of the second computer, wherein the communicating capability of the second computer is disabled by directing the second computer to a remediator website until the infective element is removed from the second computer, the remediator website operable to facilitate removal of the infective element from the second computer.

15. The method of claim 14, wherein the communicating capability of the second computer is disabled by executing a selected one of removing and reassigning an address associated with the second computer such that the second computer cannot communicate the infective element to a next destination.

16. The method of claim 14, further comprising communicating the signal to a third computer operable to receive the signal and to identify the address of the second computer such that communications from the second computer are recognized and rejected by the third computer until the infective element is removed.

17. The method of claim 14, further comprising communicating the signal to the second computer.

18. The method of claim 14, further comprising responding to receiving the signal by communicating an alert signal to one or more network components, the alert signal including the address of the second computer associated with the infective element.

19. The method of claim 14, further comprising authenticating the first computer before disabling the communicating capability of the second computer.

20. The method of claim 14, further comprising:
 providing one or more network services to each of the first and second computers; and
 restricting one or more of the network services provided to the first and second computers based on a location of the infective element.

21. The method of claim 14, further comprising:
 generating and communicating, by a third computer, an additional signal that identifies the second computer as being associated with the infective element; and
 disabling the communicating capability of the second computer after receiving both of the signals.

22. A method for detecting an infective element in a network environment, the method comprising:
 detecting, by a first computer, an infective element at a second computer based on communications between the first and second computers;
 generating and communicating a signal that identifies the second computer as being associated with the infective element, wherein the signal includes an address associated with the second computer; and
 receiving the signal and in response to the signal, disabling a communicating capability of the second computer, wherein the communicating capability of the second computer is disabled by directing the second computer to a remediator website until the infective element is removed from the second computer, the remediator website operable to facilitate removal of the infective element from the second computer.

23. The method of claim 22, wherein the communicating capability of the second computer is disabled by executing a selected one of removing and reassigning an address associated with the second computer such that the second computer cannot communicate the infective element to a next destination.

24. The method of claim 22, further comprising:
 receiving, by a third computer, the signal;
 identifying the address of the second computer such that communications from the second computer are recognized; and
 rejecting, by the third computer, the communications from the second computer until the infective element is removed from the second computer.

25. The method of claim 22, further comprising responding to receiving the signal by communicating an alert signal to one or more network components, the alert signal including the address of the second computer associated with the infective element.

26. The method of claim 22, further comprising:
 providing one or more network services to each of the first and second computers; and
 restricting one or more of the network services provided to the first and second computers based on a location of the infective element.

27. The method of claim 22, further comprising:
 detecting, by a third computer, the infective element within the second computer;
 generating and communicating an additional signal that identifies the second computer as being associated with the infective element; and
 disabling the communicating capability of a second computer after receiving both of the signals.

28. A system for detecting an infective element in a network environment, the system comprising:
 means for detecting, by a first computer, an infective element within a second computer;

means for generating and communicating a signal that identifies the second computer as being associated with the infective element, wherein the signal includes an address associated with the second computer; and means for receiving the signal and, in response to the signal, disabling a communicating capability of the second computer, wherein the communicating capability of the second computer is disabled by directing the second computer to a means for removing the infective element from the second computer.

29. The system of claim 28, wherein the communicating capability of the second computer is disabled by executing a selected one of removing and reassigning an address associated with the second computer such that the second computer cannot communicate the infective element to a next destination.

30. The system of claim 28, further comprising means for communicating the signal to a third computer operable to receive the signal and to identify the address of the second computer such that communications from the second computer are recognized and rejected by the third computer until the infective element is removed.

31. The system of claim 28, further comprising means for communicating the signal to the second computer.

32. The system of claim 28, further comprising means for responding to receiving the signal by communicating an alert signal to one or more network components, the alert signal including the address of the second computer associated with the infective element.

33. The system of claim 28, further comprising means for authenticating the first computer before disabling the communicating capability of the second computer.

34. The system of claim 28, further comprising:
means for generating and communicating, by a third computer, an additional signal that identifies the second computer as being associated with the infective element; and
means for disabling the communicating capability of the second computer after receiving both of the signals.

35. A system for detecting an infective element in a network environment, the system comprising:
means for detecting, by a first computer, an infective element at a second computer based on communications between the first and second computers;
means for generating and communicating a signal that identifies the second computer as being associated with the infective element, wherein the signal includes an address associated with the second computer; and
means for receiving the signal and in response to the signal, disabling a communicating capability of the second computer, wherein the communicating capability of the second computer is disabled by directing the second computer to a means for removing the infective element from the second computer.

36. The system of claim 35, wherein the communicating capability of the second computer is disabled by executing a selected one of removing and reassigning an address associated with the second computer such that the second computer cannot communicate the infective element to a next destination.

37. The system of claim 35, further comprising:
means for receiving, by a third computer, the signal;
means for identifying the address of the second computer such that communications from the second computer are recognized; and
means for rejecting, by the third computer, the communications from the second computer until the infective element is removed from the second computer.

38. The system of claim 35, further comprising means for responding to receiving the signal by communicating an alert signal to one or more network components, the alert signal including the address of the second computer associated with the infective element.

39. Software for detecting an infective element in a network environment, the software embodied in a computer readable medium and operable to:
detect, by a first computer, an infective element within a second computer;
generate and communicate a signal that identifies the second computer as being associated with the infective element, wherein the signal includes an address associated with the second computer; and
receive the signal and, in response to the signal, disable a communicating capability of the second computer, wherein the communicating capability of the second computer is disabled by directing the second computer to software for removing the infective element from the second computer.

40. The software of claim 39, wherein the communicating capability of the second computer is disabled by executing a selected one of removing and reassigning an address associated with the second computer such that the second computer cannot communicate the infective element to a next destination.

41. The software of claim 39, further operable to communicate the signal to a third computer operable to receive the signal and to identify the address of the second computer such that communications from the second computer are recognized and rejected by the third computer until the infective element is removed.

42. The software of claim 39, further operable to communicate the signal to the second computer.

43. The software of claim 39, further operable to respond to receiving the signal by communicating an alert signal to one or more network components, the alert signal including the address of the second computer associated with the infective element.

44. The software of claim 39, further operable to authenticate the first computer before disabling the communicating capability of the second computer.

45. The software of claim 39, further operable to:
generate and communicate, by a third computer, an additional signal that identifies the second computer as being associated with the infective element; and
disable the communicating capability of the second computer after receiving both of the signals.

46. Software for detecting an infective element in a network environment, the software embodied in a computer readable medium and operable to:
detect, by a first computer, an infective element at a second computer based on communications between the first and second computers;

generate and communicate a signal that identifies the second computer as being associated with the infective element, wherein the signal includes an address associated with the second computer; and receive the signal and in response to the signal, disable a communicating capability of the second computer, wherein the communicating capability of the second computer is disabled by directing the second computer to a remediator website until the infective element is removed from the second computer, the remediator website operable to facilitate removal of the infective element from the second computer.

47. The software of claim 46, wherein the communicating capability of the second computer is disabled by executing a selected one of removing and reassigning an address associated with the second computer such that the second computer cannot communicate the infective element to a next destination.

48. The software of claim 46, further operable to:
receive, by a third computer, the signal;
identify the address of the second computer such that communications from the second computer are recognized; and
reject, by the third computer, the communications from the second computer until the infective element is removed from the second computer.

* * * * *